(12) United States Patent
Janczuk et al.

(10) Patent No.: US 12,170,709 B2
(45) Date of Patent: Dec. 17, 2024

(54) MULTI-TENANCY VIA CODE ENCAPSULATED IN SERVER REQUESTS

(71) Applicant: Auth0, Inc., San Francisco, CA (US)

(72) Inventors: Tomasz Janczuk, Redmond, WA (US); Matías Woloski, Punta del Este (UY)

( * ) Notice: Subject to any disclaimer, the term of this patent is extended or adjusted under 35 U.S.C. 154(b) by 0 days.

(21) Appl. No.: 18/361,538

(22) Filed: Jul. 28, 2023

(65) Prior Publication Data
US 2023/0388379 A1  Nov. 30, 2023

Related U.S. Application Data

(63) Continuation of application No. 17/964,890, filed on Oct. 12, 2022, now Pat. No. 11,736,568, which is a
(Continued)

(51) Int. Cl.
*H04L 67/1097* (2022.01)
*G06F 8/41* (2018.01)
(Continued)

(52) U.S. Cl.
CPC .......... *H04L 67/1097* (2013.01); *G06F 8/433* (2013.01); *G06F 9/547* (2013.01);
(Continued)

(58) Field of Classification Search
CPC . H04L 67/1097; H04L 67/133; H04L 67/561; H04L 67/34; H04L 67/025; G06F 9/547; G06F 2209/549
See application file for complete search history.

(56) References Cited

U.S. PATENT DOCUMENTS

| 7,716,674 B1 * | 5/2010 | Murata ................... H04L 67/02 |
| | | 719/310 |
| 8,499,023 B1 | 7/2013 | Harris |

(Continued)

FOREIGN PATENT DOCUMENTS

| CN | 101674156 A | * | 3/2010 | ........... H04L 1/0083 |
| CN | 102685122 A | * | 9/2012 | |

(Continued)

OTHER PUBLICATIONS

Int'l App. No. PCT/US2015/062635, International Search Report and Written Opinion dated Feb. 1, 2016, 10 pages.
(Continued)

*Primary Examiner* — Shean Tokuta
(74) *Attorney, Agent, or Firm* — Holland & Hart LLP

(57) ABSTRACT

A multitenant infrastructure server (MTIS) is configured to provide an environment to execute a computer routine of an arbitrary application. The MTIS receives a request from a webtask server to execute the computer routine in a webtask container. The computer routine is executed in the webtask container at the MTIS. Upon successful execution of the computer routine, a result set is returned to the webtask server. If the execution of the computer routine is unsuccessful, an error notification is returned to the webtask server. The resources consumed during the execution of the computer routine are determined. The webtask container is destroyed to prevent persistent storage of the computer routine on the MTIS.

20 Claims, 5 Drawing Sheets

Related U.S. Application Data continuation of application No. 17/877,887, filed on Jul. 30, 2022, now Pat. No. 11,582,303, which is a continuation of application No. 16/686,023, filed on Nov. 15, 2019, now Pat. No. 11,622,003, which is a continuation of application No. 14/951,223, filed on Nov. 24, 2015, now Pat. No. 10,516,733.

(60) Provisional application No. 62/084,511, filed on Nov. 25, 2014.

(51) Int. Cl.
  *G06F 9/54* (2006.01)
  *G06F 16/955* (2019.01)
  *G06F 21/53* (2013.01)
  *G06F 21/60* (2013.01)
  *H04L 67/00* (2022.01)
  *H04L 67/025* (2022.01)
  *H04L 67/133* (2022.01)
  *H04L 67/561* (2022.01)

(52) U.S. Cl.
  CPC ............ *G06F 16/955* (2019.01); *G06F 21/53* (2013.01); *G06F 21/604* (2013.01); *H04L 67/133* (2022.05); *H04L 67/34* (2013.01); *H04L 67/561* (2022.05); *G06F 2209/549* (2013.01); *H04L 67/025* (2013.01)

(56) References Cited

U.S. PATENT DOCUMENTS

| | | | |
|---|---|---|---|
| 8,843,386 B2 * | 9/2014 | Greene | H04L 41/0894 705/7.11 |
| 8,843,997 B1 | 9/2014 | Hare | |
| 8,893,282 B2 | 11/2014 | Pennington et al. | |
| 8,966,464 B1 * | 2/2015 | Christopher | G06F 11/3442 717/166 |
| 9,122,562 B1 * | 9/2015 | Stickle | G06F 9/5077 |
| 9,146,764 B1 * | 9/2015 | Wagner | G06F 9/546 |
| 9,223,988 B1 | 12/2015 | Dorwin | |
| 9,253,253 B1 * | 2/2016 | Bhattacharyya | G06F 9/5027 |
| 9,355,374 B2 * | 5/2016 | Barnett | H04L 9/14 |
| 9,413,774 B1 | 8/2016 | Liu et al. | |
| 9,703,611 B1 * | 7/2017 | Christopher | G06F 9/5027 |
| 9,754,116 B1 * | 9/2017 | Roth | G06F 21/602 |
| 9,830,193 B1 * | 11/2017 | Wagner | G06F 9/45558 |
| 9,922,192 B1 * | 3/2018 | Kashyap | G06F 9/45533 |
| 9,953,316 B2 * | 4/2018 | Barnett | H04L 63/0428 |
| 10,048,974 B1 | 8/2018 | Wagner et al. | |
| 10,089,476 B1 * | 10/2018 | Roth | G06Q 20/14 |
| 10,324,803 B1 * | 6/2019 | Agarwal | G06F 16/113 |
| 10,382,405 B2 * | 8/2019 | Barnett | H04L 63/123 |
| 10,516,667 B1 * | 12/2019 | Roth | H04L 63/08 |
| 10,516,733 B2 * | 12/2019 | Janczuk | G06F 21/604 |
| 10,576,733 B2 | 3/2020 | Falk | |
| 10,749,845 B2 * | 8/2020 | Barnett | H04L 9/3226 |
| 10,873,623 B2 * | 12/2020 | Khanna | G06F 9/5072 |
| 10,880,277 B2 * | 12/2020 | Barnett | H04L 63/0428 |
| 11,036,568 B1 * | 6/2021 | Foreman | G06F 9/4843 |
| 11,070,621 B1 * | 7/2021 | Tornow | H04L 67/1097 |
| 11,422,862 B1 * | 8/2022 | Faulhaber | G06F 9/45504 |
| 11,582,303 B2 * | 2/2023 | Janczuk | H04L 67/34 |
| 11,622,003 B2 | 4/2023 | Janczuk et al. | |
| 11,736,568 B2 * | 8/2023 | Janczuk | G06F 21/604 709/217 |
| 2004/0172618 A1 * | 9/2004 | Marvin | G06F 8/36 717/116 |
| 2008/0208364 A1 * | 8/2008 | Grgic | G06F 9/5077 700/2 |
| 2008/0244576 A1 | 10/2008 | Kwon et al. | |
| 2009/0172792 A1 | 7/2009 | Backhouse | |
| 2010/0191806 A1 * | 7/2010 | Kim | G06F 16/41 709/203 |
| 2011/0054879 A1 | 3/2011 | Bogsanyl et al. | |
| 2011/0191750 A1 * | 8/2011 | Charisius | G06F 8/33 717/105 |
| 2011/0264861 A1 * | 10/2011 | Fee | G06F 9/5027 711/E12.024 |
| 2012/0072762 A1 | 3/2012 | Atchison et al. | |
| 2012/0159523 A1 | 6/2012 | Kulkarni et al. | |
| 2012/0210333 A1 * | 8/2012 | Potter | G06F 9/4843 719/313 |
| 2012/0246221 A1 * | 9/2012 | Miyawaki | G06F 21/6236 709/203 |
| 2013/0031144 A1 | 1/2013 | Elango et al. | |
| 2013/0055251 A1 * | 2/2013 | Anderson | G06F 9/5077 718/1 |
| 2013/0117804 A1 | 5/2013 | Chawla et al. | |
| 2013/0145006 A1 * | 6/2013 | Tammam | G06F 9/5027 709/223 |
| 2013/0212595 A1 * | 8/2013 | Fanning | G06F 9/44521 719/313 |
| 2013/0340028 A1 * | 12/2013 | Rajagopal | H04L 63/10 726/1 |
| 2014/0006580 A1 * | 1/2014 | Raghu | H04L 41/22 709/223 |
| 2014/0095974 A1 | 4/2014 | Cui et al. | |
| 2014/0096221 A1 * | 4/2014 | Wallis | G06F 21/335 726/9 |
| 2014/0136689 A1 | 5/2014 | Beaty et al. | |
| 2014/0285673 A1 | 9/2014 | Hundley et al. | |
| 2014/0304299 A1 | 10/2014 | Yan et al. | |
| 2014/0330869 A1 * | 11/2014 | Factor | G06F 21/6281 707/783 |
| 2014/0330936 A1 * | 11/2014 | Factor | H04L 63/0281 709/219 |
| 2015/0058376 A1 | 2/2015 | Soshin | |
| 2015/0178055 A1 * | 6/2015 | Fee | G06F 9/5027 717/146 |
| 2015/0261971 A1 * | 9/2015 | McFerrin | H04L 63/10 707/781 |
| 2015/0270961 A1 * | 9/2015 | Barnett | H04L 9/14 713/189 |
| 2016/0092251 A1 * | 3/2016 | Wagner | G06F 9/5077 718/1 |
| 2016/0094624 A1 * | 3/2016 | Mordani | H04L 67/02 709/203 |
| 2016/0094647 A1 * | 3/2016 | Mordani | H04L 47/70 709/226 |
| 2016/0124735 A1 * | 5/2016 | Dingsor | G06F 9/5083 717/177 |
| 2016/0147529 A1 * | 5/2016 | Coleman | G06F 8/71 717/120 |
| 2016/0150053 A1 * | 5/2016 | Janczuk | G06F 8/433 709/217 |
| 2016/0314461 A1 * | 10/2016 | Barnett | H04L 9/3226 |
| 2016/0344595 A1 * | 11/2016 | Jain | H04L 67/1008 |
| 2018/0113879 A1 * | 4/2018 | Minagawa | G06F 11/3419 |
| 2018/0143865 A1 * | 5/2018 | Wagner | G06F 9/45558 |
| 2018/0211251 A1 * | 7/2018 | Barnett | H04L 9/3226 |
| 2018/0309735 A1 * | 10/2018 | Barnett | H04L 63/08 |
| 2018/0329755 A1 * | 11/2018 | Obstfeld | G06F 9/5044 |
| 2019/0034313 A1 * | 1/2019 | Vedurumudi | H04L 43/55 |
| 2019/0075154 A1 * | 3/2019 | Zhang | G06F 9/547 |
| 2019/0364024 A1 * | 11/2019 | Barnett | H04L 9/14 |
| 2020/0092369 A1 * | 3/2020 | Janczuk | G06F 16/955 |
| 2021/0019382 A1 * | 1/2021 | Huang | G06F 21/31 |
| 2021/0185020 A1 * | 6/2021 | Barnett | H04L 9/3226 |
| 2021/0263663 A1 | 8/2021 | Bansal et al. | |
| 2022/0377140 A1 * | 11/2022 | Janczuk | H04L 67/561 |
| 2023/0035701 A1 | 2/2023 | Janczuk et al. | |
| 2023/0072584 A1 * | 3/2023 | Janczuk | G06F 8/433 |
| 2023/0388379 A1 * | 11/2023 | Janczuk | H04L 67/34 |

FOREIGN PATENT DOCUMENTS

| | | | | |
|---|---|---|---|---|
| CN | 102915416 A | * | 2/2013 | |
| CN | 110955492 A | * | 4/2020 | .......... G06F 11/1484 |
| CN | 110968361 A | * | 4/2020 | ............. G06F 21/53 |
| CN | 113903219 A | * | 1/2022 | |

(56) References Cited

FOREIGN PATENT DOCUMENTS

| CN | 114064190 A * | 2/2022 | |
|---|---|---|---|
| EP | 3201767 A1 | 8/2017 | |
| EP | 3210150 A4 * | 7/2018 | ........... G06F 16/955 |
| EP | 3210150 B1 * | 4/2021 | ........... G06F 16/955 |
| EP | 3863262 A1 * | 8/2021 | ........... G06F 16/955 |
| ES | 2877363 T3 * | 11/2021 | ........... G06F 16/955 |
| JP | 2009517724 A * | 4/2009 | |
| JP | 2009104250 A * | 5/2009 | |
| JP | 2011233146 A | 11/2011 | |
| JP | 2013543171 A | 11/2013 | |
| TW | 201303613 A * | 1/2013 | .......... G06F 11/3433 |
| WO | WO-2008073618 A2 | 6/2008 | |
| WO | WO-2009113571 A1 * | 9/2009 | ............. G06F 21/53 |
| WO | WO-2014031540 A1 * | 2/2014 | ............... G06F 9/24 |
| WO | WO-2016086111 A1 | 6/2016 | |

OTHER PUBLICATIONS

Amazon Web Services, AWS Lambda Developer Guide API Version Nov. 13, 2014, Retrieved from the Internet URL: https://web.archive.org/web/20141212000213/http://docs.aws.amazon.com/lambda/latest/dg/lambda-dg.pdf, Nov. 13, 2014, 110 pages.
Jeff Barr: AWS Lambda—Run Code in the Cloud, AWS News Blog, Nov. 13, 2014 (Nov. 13, 2014) XP055478160, Retrieved from the internet: URL: https://aws.amazon.com/blogs/aws/run-code-cloud/ [retrieved on May 24, 2018].
EP Application No. 15864053.2, Examination Search Report dated Aug. 28, 2019, 8 pages.
EP Application No. 21165117.9, Search Report dated Jul. 12, 2021, 9 pages.

* cited by examiner

MULTI-TENANCY VIA CODE ENCAPSULATED IN SERVER REQUESTS

CROSS-REFERENCES TO RELATED APPLICATIONS

This application is a continuation of U.S. patent application Ser. No. 17/964,890, filed on Oct. 12, 2022, and entitled "MULTI-TENANCY VIA CODE ENCAPSULATED IN SERVER REQUESTS," which is a continuation of U.S. patent application Ser. No. 17/877,887, now U.S. Pat. No. 11,582,303, filed on Jul. 30, 2022, and entitled "MULTI-TENANCY VIA CODE ENCAPSULATED IN SERVER REQUESTS," which is a continuation of U.S. patent application Ser. No. 16/686,023, now U.S. Pat. No. 11,622,003, filed on Nov. 15, 2019, and entitled "MULTI-TENANCY VIA CODE ENCAPSULATED IN SERVER REQUESTS," which is a continuation of U.S. patent application Ser. No. 14/951,223, now U.S. Pat. No. 10,516,733, filed on Nov. 24, 2015, and entitled "MULTI-TENANCY VIA CODE ENCAPSULATED IN SERVER REQUESTS," which claims the benefit of priority under 35 U.S.C. § 119 from U.S. Provisional Patent Application Ser. No. 62/084,511, filed on Nov. 25, 2014, and entitled "MULTI-TENANCY VIA CODE ENCAPSULATED IN SERVER REQUESTS," all of which are incorporated herein by reference in their entirety.

BACKGROUND

Computer application architectures have trended towards distributing different computing functions across multiple computers. Indeed, a majority of modern mobile and web applications are based on a distributed architecture. For example, in a client-server architecture, the split of application functionality between the front end and the backend helps reuse backend computing resources across several clients. It also creates a trust boundary between the client and the server, which enables servers to authorize access to protect data or functionality. In a typical client-server application, the client submits data for processing after authenticating itself to the backend, and the backend responds after processing of the client request using protected resources.

A typical cloud backend of an application (e.g., mobile or web) provides raw computing resources (e.g., CPU, memory, disk, network, etc.) as well as the operating system and application framework capabilities that are different from that of the client. The backend encapsulates server code that implements part of the application logic as well as secrets this code requires to access protected data or functionality, such as database connection strings, application program interfaces (API), security keys, etc.

Managing an infrastructure that hosts backend code may involve sizing, provisioning, and scaling various servers, managing operating system updates, dealing with security issues, updating hardware as needed, and then monitoring all these elements for possible malfunctions. Thus, much effort is typically spent just on the logistics of managing the backend. This effort may be better spent in developing, optimizing and/or deploying computer applications.

Over the years, cloud computing has increased in popularity because it reduces Information Technology (IT) costs, and makes server computing capability available as a commodity/utility. Previously, the main approach to reduce costs was to lower the IT staff by outsourcing server computing functions to cloud computing vendors. However, presently there are several competing cloud computing vendors, so cost reductions are now primarily technical in nature.

One technical approach to reduce costs, is to increase application density. Specifically, hosting an application has resource costs such as memory and CPU. If there is a way to share those resource costs across applications, then those resource costs can be spread over those applications. Accordingly, multi-tenancy techniques have arisen to share virtual machine resources, thereby increasing application density.

The cost to provision and allocate a physical machine is greater than the cost to provision and allocate a virtual machine. In turn, the cost to provision and allocate a virtual machine is greater than the cost to provision and allocate a multi-tenant container. Finally, the cost to execute a process in a container in turn is more expensive than the cost to execute a thread. Ideally, for a class of lightweight web applications, application density could be maximized by running each application on a per thread basis. However, while operating systems allow processes to manage resources, they do not provide adequate functionality to manage resources at the thread level. Specifically, information assets of different tenants should be isolated from each other, such as in a multi-tenant container, and resource use should be managed and metered to maintain quality of service and allow for billing by the cloud computing vendor.

While platform as a service (PaaS) solutions that allow customers to develop, run, and manage Web applications without the complexity of building and maintaining the infrastructure typically associated with developing and launching an app exist, they come with various concerns. For example, known PaaS platforms may not provide an attractive cost structure and may run on an asynchronous programming model, requiring polling for the results of the computation, which adversely affects latency. Further, known PaaS architectures may require the code not only to be uploaded but also persistently stored. The code then waits for events in order to complete its task. However, such approach includes security risks in that the code is managed elsewhere, making it vulnerable to copying or being hacked. It is with respect to these considerations and others that the present disclosure has been written.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

This disclosure generally relates to methods and systems of running a computer routine in a virtual environment. The computing environment discussed herein receives the computer routine in the form of computer code from a computer developer. A determination is made of which computing language or languages are being used in the routine. A container is created specifically for the routine, such that it is provisioned to support the languages in the routine and any other infrastructure utilized or invoked by the routine. Accordingly, the container will envelop the routine in a complete environment that includes the elements to run, such as code or a link thereto, system tools, system libraries, etc., thereby assuring that that the routine will run in its virtual destination environment. The virtual destination environment provides the raw resources required to execute the routine, including memory, processing power, networking, etc. Unlike known approaches, the routine is not uploaded for storage at rest, mapped to events, and stored at rest at the destination computing environment (i.e., virtual machine). Rather, the routine is routed to a virtual machine with the corresponding environment for execution without an expectation that the code will run again. Thus, the code is not stored at rest but destroyed upon completion of the execution of the code.

A request to execute the routine may be for an arbitrary application in that it is independent of the guest operating system of the virtual destination environment. Computer routine execution requests may be processed in a multi-tenancy infrastructure, thereby providing isolation and metering capabilities. Requests may be in an arbitrary programming language, provided that language bindings to the multi-tenancy infrastructure are available.

Advantageously, the need to install and run a computer routine (e.g., applications) on the user's own computer(s) is thereby rendered unnecessary, which simplifies maintenance, scalability, security, and support. Further, in one embodiment, the use of cloud computing helps avoid upfront infrastructure costs and allows businesses to have their code executed faster, with improved manageability and less maintenance. Since the code to be executed is isolated in its container and the container is destroyed upon completion of the execution, additional security is provided.

Example System Architecture

Figure 1:
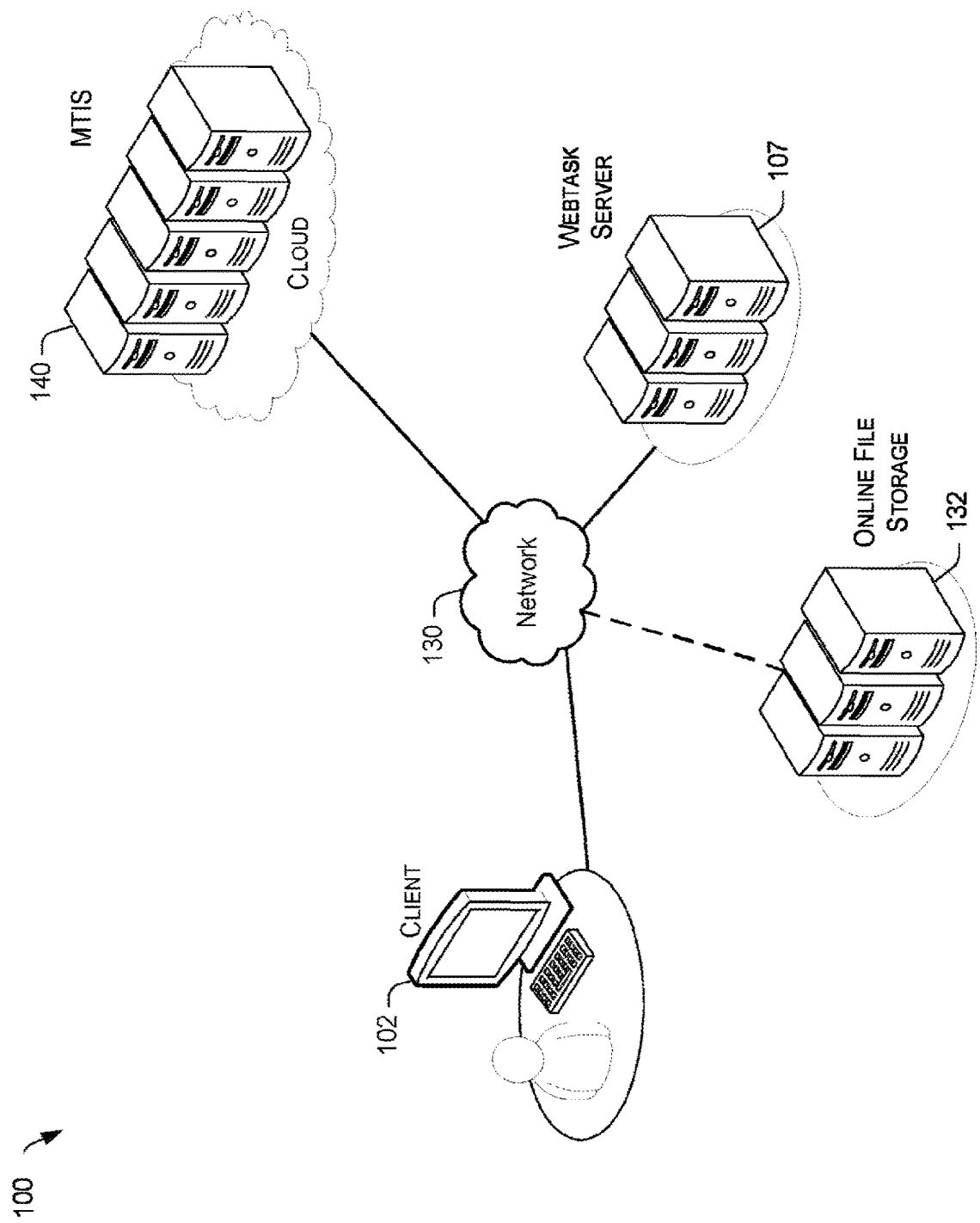
FIG. 1 illustrates an example architecture for running a code of an arbitrary application in a secure multi-tenant environment.

FIG. 1 illustrates an example architecture for running a routine of an arbitrary application in a secure multi-tenant environment. System 100 includes a client 102, a webtask server 107, a multi-tenant infrastructure server (MTIS) 140 that may include multiple containers, and an online file storage server 132. There is a network 130 that facilitates communication between the different components of system 100. The network 130 may be, without limitation, a local area network ("LAN"), a virtual private network ("VPN"), a cellular network, or the Internet. Accordingly, the client can communicate with the webtask server 107 via the network 130 to send a computer routine of an arbitrary application to be processed and to receive the corresponding results of the processing therefrom. In one embodiment, instead of sending the routine to the webtask server 107, a link is sent to a repository where the routine's code is stored, such as the online file storage server 132.

The webtask server 107 is configured to receive information from the client 102 and wrap the routine in a complete package that includes infrastructure to run in isolation in the MTIS 140. The webtask server 107 then sends the "package" to the MTIS 140. The webtask server 107 requests a container that has all the infrastructure to be used by the computer routine from the MTIS 140. The webtask server 107 then dispatches the computer routine together with metadata in the form of a package to the container specified by the MTIS 140. The container then runs the routine in the package according to the metadata. The container returns the results from running the routine back to the webtask server 107. The webtask server 107 then returns the results back to the client 102 (e.g., on their browser).

The MTIS 140 may operate on a cloud and include raw computing resources that are used to execute the computer routine received from the webtask server 107. This routine to be executed is non-persistent in that it is not stored in the MTIS 140. Instead, the routine is discarded upon completion of the execution of the computer routine.

Example Functional Blocks

Figure 2:
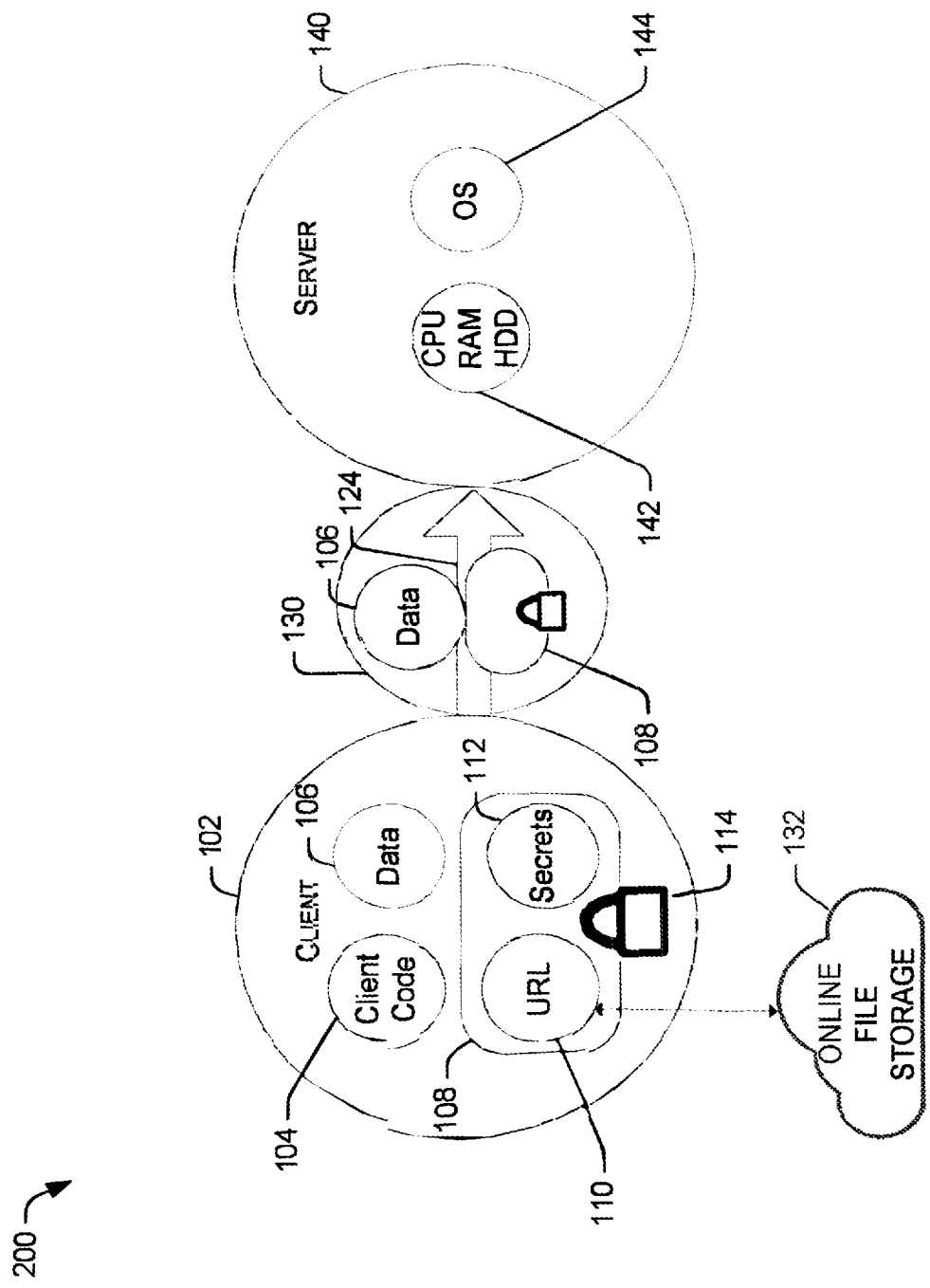
FIG. 2 illustrates a block diagram of the data framework for executing code in multi-tenant containers.

Reference now is made to FIG. 2, which illustrates a block diagram of the data framework for executing code (e.g., a computer routine) in multi-tenant containers. System 100 illustrates a client 102 communicating with a server 140 via a network 130.

The server 140 may operate on a cloud and include raw computing resources 142, such as CPU, memory, disk, etc., as well as an operating system 144. Thus, server 140 provides raw computing resources 142 and an operating system, which can be viewed as a cloud commodity. Server 140 provides the backend for an application in the form of a computer routine to be run. What is notably missing from the server 140 is server code that implements part of the application logic as well as secrets this code requires to access protected data or functionality, such as database connection strings, API keys, etc. Both server code and the secrets are data that are serialized together into one bundle 108 and can now be found in the client 102. Further, in one embodiment, instead of storing all of the server code in the bundle 108 of the client 102, the code is externalized to a location that can be referenced with a uniform resource identifier (URL) 110, such as GitHub® or Amazon Simple Storage Service (S3). Thus, the code can be linked to an online file storage server 132.

The bundle 108, comprising the code (e.g., computer routine) for an arbitrary application (or a URL link thereto) 110, and the client secrets 112, is referred to herein as a webtask token 108, which defines backend application logic along with secrets for its execution. In one embodiment, it is cryptographically protected 114 from tampering and disclosure. It can be safely stored or passed through untrusted channels, like network 130.

It is the webtask server (e.g., 107 in FIG. 1) that decrypts the webtask token 110 and provides the already decrypted material to the server 140 (e.g., MTIS). For example, the decryption is performed by the webtask server 107 because webtask containers in the server 140 (e.g., MTIS) execute untrusted code and therefore are not given the cryptographic keys to decrypt webtask tokens 110.

Since webtask tokens 108 may include URL links 110 to the server code rather than the code (e.g., computer routine) itself, the serialized size of the token is relatively small given today's bandwidth standards. Accordingly, webtask tokens 108 offer the flexibility of being able to be passed around as part of the payload in various protocols, including hypertext transfer protocol (HTTP). In the example of FIG. 1, the webtask token is stored in the client 102 application itself. Accordingly, by keeping backend secrets 112 included in the webtask token 108 at the client 102 end, the secrets remain safe from disclosure due to the encryption 114. Thus, the webtask token is resistant to tampering and spoofing.

When a request 124 originates from the client 102 and is sent to the server 140 over the network 130 to execute a computer routine for an arbitrary application, the request 124 may include the client specific data 106, as well as the webtask token 108, creating a webtask request. Accordingly, a webtask request is a request 124 from the client 102, which includes a webtask token 110 in addition to regular client request data 106.

In one embodiment, the server 140 receives the webtask request 124 (i.e., comprising the webtask token 108 and the client data 106), retrieves the computer routine from the online file storage 132, based on the URL 110 provided in the webtask token 108, and applies the appropriate computing resources 142 to execute the webtask request. Accordingly, server 140 provides a generic execution environment for executing any webtask request, instead of being focused on a particular application logic. A server, such as server 140 that provides a generic and uniform execution environment for webtasks, is sometimes referred to herein as an MTIS.

In one embodiment, in order to remain generic, the MTIS 140 provides a uniform execution environment for all webtasks. Thus, backend logic of various applications that run on the MTIS 140 have access to the same functionality provided by the operating system (OS) 144 and pre-installed software packages.

The uniformity of the MTIS 140 together with the lack of an application-specific state imposed by the webtask model has several advantages over traditional backends. For example, webtask runtime can easily be scaled 104 by various disparate applications. It therefore enables an application logic layer to leverage some of the same economies of scale that large data centers utilize at the hardware level. Accordingly, the MTIS 140 enables commoditization of application logic processing at a higher level of abstraction than known PaaS.

Example Multi-Tenant Model for Sandboxing Untrusted Computer Routines

In one embodiment, the MTIS 140 architecture is multi-tenant. Multitenancy refers to an architecture in which a single instance of a computer routine (e.g., software) runs on a server while serving multiple tenants. A tenant comprises a group of users who share a common access with specific privileges to the software. With such a multitenant architecture, a software application provides every tenant a share of the data, configuration, user management, tenant individual functionality, as well as non-functional properties. As noted before, the multitenancy architecture of the MTIS 140 discussed herein increases application density.

One consideration in the multi-tenant architecture of the MTIS 140 is how to prevent malicious (or a simply badly written) computer routine of one tenant from accessing data of another tenant. In this regard, the webtask request discussed herein may invoke a sandbox in the MTIS 140. A sandbox is a security mechanism for separating running programs. It provides a tightly controlled set of resources for guest programs to run in, such as a dedicated space on a memory. To that end, Docker® may be used to create a secure (CONTAINER) sandbox around the webtask request. For example, Docker® separates applications from the infrastructure using container technology, similar to how virtual machines separate the operating system from bare metal. The webtask request may be implemented as a Docker® container that provides a link to a computer routine and wraps the computer routine in a complete filesystem that essentially includes the components to run, such as the runtime, system tools, system libraries, etc., thereby assuring that it will run in its destination environment (i.e., the MTIS 140).

In one embodiment the custom computer routine that is executed using webtask requests 124 is in the context of an HTTP request. Execution time may be limited to the typical lifetime of an HTTP request. Put differently, webtask requests 124 have a duration sufficiently short to be satisfied by the HTTP request/response cycle or equivalent cycle.

For example, the webtask request 124 accepts an HTTP POST request from the client 102 including the server code (or link thereto) in the webtask request 124 body. In one embodiment, the webtask request 124 also specifies the webtask container name, which denotes the isolation boundary the computer routine will execute in at the MTIS 140. There may be a 1:1 map of customer to webtask container, which means the computer routine related to one subscriber is always isolated from the computer routine of another subscriber. The MTIS 140 executes the custom computer routine in an isolated environment, referred to sometimes herein as the webtask container, and sends back a response with the results. In one embodiment, the response is in JavaScript Object Notation (JSON). Thus, the custom computer routine provided via the webtask request 124 executes in a uniform environment across all tenants.

A webtask request 124 includes the computer routine (or a link thereto) as well as contextual data required during its execution. For example, the client 102 submits a JavaScript function closure. The MTIS 140 invokes that function and provides a single callback parameter. When the custom computer routine in the webtask request has finished executing in the webtask container, it calls the callback and provides an indication of an error or a single result value. In one embodiment, that result value is then serialized as JSON and returned to the client 102 in the HTTP response.

In one embodiment, the MTIS 140 is based on Node.js, which allows a custom computer routine to utilize a fixed set of Node.js modules pre-provisioned in the webtask environment. The set of supported modules may be provided by the specific requirements of various extensibility scenarios. The uniformity of the computing environment across all tenants in the MTIS 140 allows the keeping of a pool of pre-warmed webtask containers ready to be assigned to tenants when a request 124 arrives. This reduces the cold startup latency.

The MTIS 140 is configured to reduce the amount of overhead in allocating resources to process the webtask request 124. Resource allocation overhead may come in the form of spawning virtual machines, spawning processes, spawning threads, and allocating memory. Accordingly, the MTIS 140 may use resource pooling.

In one embodiment, computer routine environments can be isolated using third party infrastructure compartments such as those provided by Docker® (an open source). Docker® merely abstracts away environment, but does not provide multi-tenancy. Virtual machines may also be pooled by the cloud infrastructure of the vendor and/or by a request by the MTIS 140.

The MTIS 140 can spawn a process pool, and in lieu of de-allocating processes, can return the process to the pool. However, to reduce cloud overhead, in practice, the number of processes allocated may be in the single digits, since requests are assumed to be single threaded. Process management can also be managed by the execution environment such as the Java Virtual Machine or Node.js® runtime.

The MTIS 140 may also use isolation and context primitives, such as v8::isolate and v8::context to ensure execution of the computer routine in an isolated manner. In one embodiment, the MTIS 140 may manage its own memory. Alternatively, the execution environment such as the Java Virtual Machine or Node.js® may manage its own memory. Note that the execution environment may have its own memory allocator and its own garbage collection.

In one embodiment, security may be implemented by using isolation primitives. Specifically, an execution environment may execute the computer routine in a respective sandbox. Additional security and authentication might be performed by the MTIS 140. More typically, initial authentication may be to a public account to the cloud infrastructure. Thus, authentication need not be on a per requests basis, thereby improving performance.

In one embodiment, language bindings are managed by the execution environment (i.e., MTIS 140). Bindings may be native to the execution environment, or alternatively via an add-on, typically in the form of a dynamically linked library. Execution environments (with different languages) may also be discovered dynamically since sandboxes, which may be preconfigured with various execution environments, are able to enumerate those execution environments programmatically. Accordingly, the MTIS 140 can determine what is supported, and quickly respond with an error message rather than having to spawn/invoke a sandbox.

Pre-compilation may be an optimization implemented via the MTIS 140. For example, the computer routine embedded in a webtask request 124 may be byte-code rather than source code. Where stored procedures are invoked, a server-side database may have precompiled stored procedure (note the stored procedure may be resident on the MTIS 140). In this way, a webtask request 124 can be made dependent solely on parameters of the computer routine sent.

In various embodiments, the multi-tenant system described herein provides various assurances for secure computer routine execution. First, there is data isolation where the computer routine of one tenant is prevented from accessing the computer routine or data of another tenant. For example, if one tenant runs a computer routine or data that accesses a custom database using a connection string or URL with an embedded password, the computer routine of another tenant running in the same system is prevented from discovering that password.

Second, a controlled resource consumption to mitigate authenticated Denial of Service (DOS) attacks is provided. To that end, in one embodiment, the sandbox of the webtask request 124 limits the amount of memory, CPU, and other system resources any one tenant can use.

Figure 3:
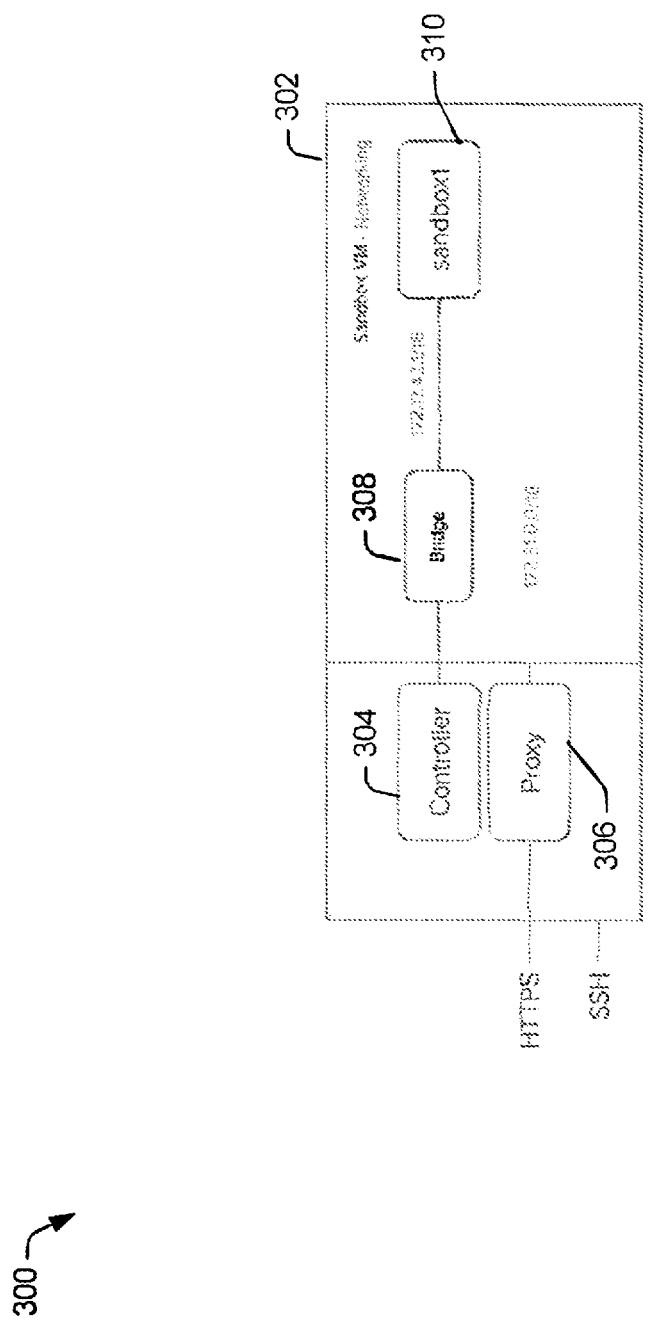
FIG. 3 illustrates an example webtask virtual machine that may be used as the multi-tenant infrastructure server of FIG. 1.

Reference now is made to FIG. 3, which illustrates an example webtask virtual machine (VM) that may be used as the MTIS 140 of FIG. 1. To isolate the computer routine and data of one tenant from another, every tenant's computer routine is run in its own webtask container (e.g., Docker®) in a sandbox 310. When an HTTP request arrives at a webtask VM, such as the MTIS 140, it is first processed by a proxy 306. The proxy 306 maintains a state representing the association between tenants and containers. In one embodiment, the proxy 306 looks at the etcd configuration to determine if a webtask container is already assigned for a particular tenant. If it is, the proxy 306 forwards the request to that webtask container 310. If it is not, the proxy assigns a new webtask container for that tenant from a pool of pre-warmed webtask containers available in the webtask cluster. The proxy then records that association in etcd (i.e., a daemon that runs across all computers in a cluster and provides a dynamic configuration registry, allowing various configuration data to be shared between the cluster members) for the sake of subsequent requests.

The pre-warmed pool of webtask containers is made possible by the uniform execution environment for all tenants. Being able to pick a pre-warmed container from a pool reduces cold startup latency compared to provisioning a container on the fly, even if one takes into account the already low startup latency of Docker® containers.

In one embodiment, any single webtask container is just a simple HTTP server that allows multiple, concurrent requests to be processed on behalf of a single tenant. Requests executing within a specific webtask container are not isolated from each other. The lifetime of the webtask containers is managed by the controller daemon, which runs in a trusted Docker® container and can therefore terminate any webtask container in a cluster following a pre-configured lifetime management policy.

In one embodiment, in addition to running every tenant's computer routine in its own Docker® container 310, egress firewall rules are configured in a webtask cluster. These rules prevent an untrusted computer routine in one webtask container from communicating with other webtask containers or the webtask infrastructure. Setting up the firewall rules is possible because the HTTP server of the webtask container is running on a local network separated from the host's network by a bridge 308 (e.g., created by Docker®). In one embodiment, the computer routine running in the webtask container can initiate outbound calls to the public internet. This enables outbound communication from the custom computer routine to external data sources and services, such as a customer's database or corporate edge services.

To limit memory and CPU consumption, a control groups (cgroups) mechanism (e.g., provided by Docker®) may be used. It should be noted that cgroups are mechanisms supported by Linux, while Docker® is a technology that builds on top of cgroups. In addition, every webtask container may create a transient Linux user and configures Pluggable Authentication Modules (PAM) limits for that user on startup. These two mechanisms together help prevent a range of attacks on memory and CPU such as fork bombs.

Example Call Flow Process

Figure 4:
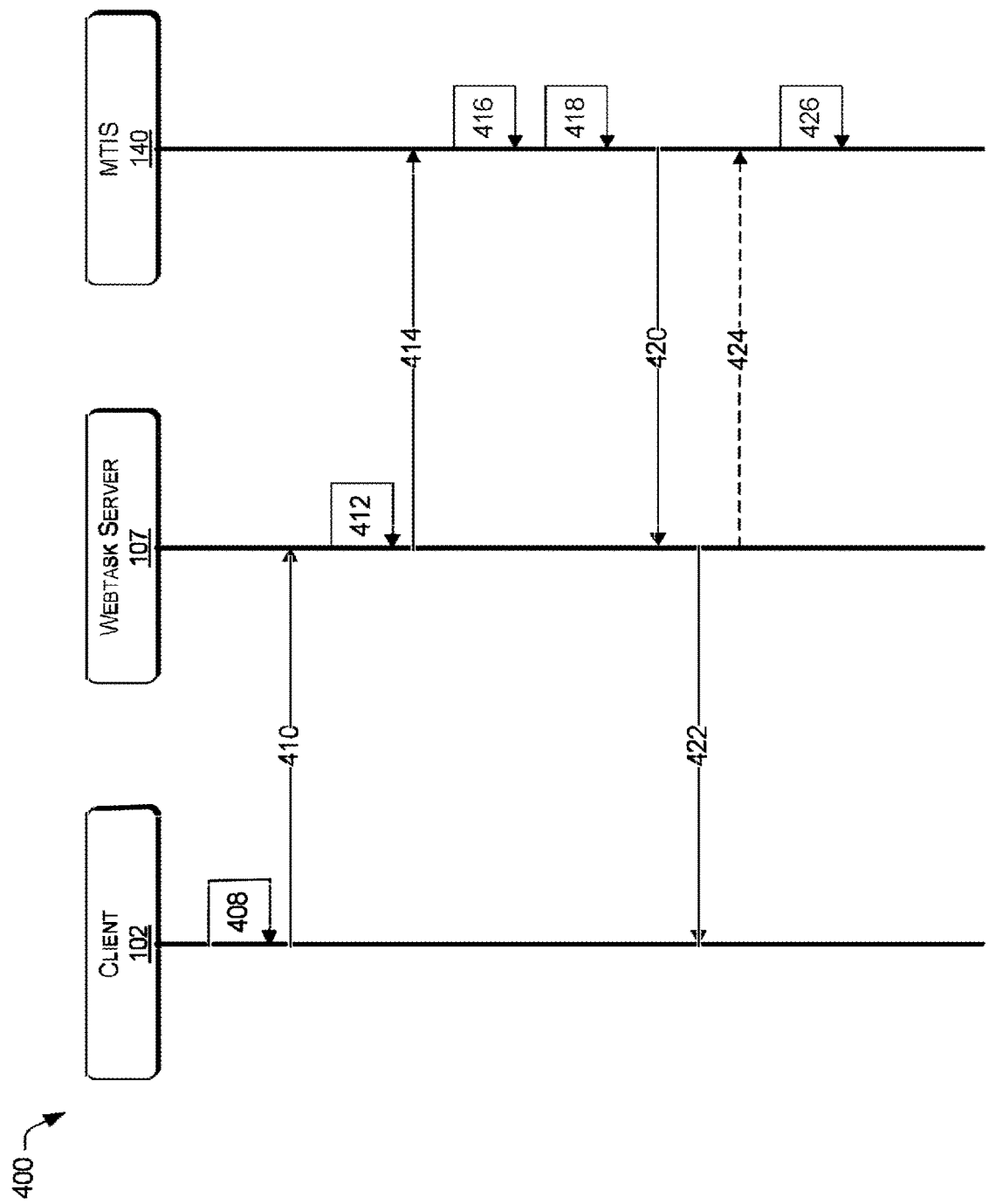
FIG. 4 illustrates a high-level example call flow processes for executing a code in a multi-tenant infrastructure environment.

With the foregoing overview of the multi-tenancy via code encapsulated in server requests system, it may be helpful now to consider a high-level discussion of example call flow processes. To that end, FIG. 4 illustrates a high-level example call flow process for executing a code (e.g., computer routine) in a multi-tenant infrastructure environment, wherein the executed computer routine is non-persistent. The call flow process 400 is illustrated as a collection of steps in a logical call flow, which represents a sequence of operations that can be implemented in hardware, software, or a combination thereof. In the context of software, the steps represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 is described with reference to system 100 of FIG. 1. In the example call flow 400, there is a client 102, a webtask server 107, and a multi-tenant infrastructure server (MTIS) 140 in a cloud.

In step 408, a developer prepares a piece of code (e.g., a computer routine) to be executed on their computing device, represented in flow 400 as the client 102. In one embodiment, the computer routine is stored in an online file storage server 132.

In step 410, a connection is established with the webtask server 107 and a request is sent to a well-defined endpoint a, where the computer routine for an arbitrary application to be executed is a parameter of the request. The webtask request 124 includes a webtask token 108 as well as client data 106. In various embodiments, the webtask token 108 may comprise the computer routine (or a URL link to an online file storage that stores the computer routine 130) and client secrets 112 associated with the computer routine. In one embodiment, if the webtask server 107 cannot be reached by the client 102, then a failed connection error is returned to the client 102. To that end, the computer routine may have a handler to address this error.

In step 412, the webtask server 107 receives the webtask token together with the client data 106 and determines the type of computer routine used. Based on the computer routine, the webtask server 107 creates a webtask request 124 that includes the webtask token 108 and the client data. In various embodiments, the webtask token may invoke a multi-tenant container (e.g., such as Docker®) that wraps the computer routine in a complete environment that includes the components to run in in isolation in the MTIS 140. This container is sometimes referred to herein as a webtask container.

In one embodiment, the webtask server 107 is an HTTP server, the connection during the communication 410 between the client 102 and the webtask server 107 is an HTTP connection, and the webtask request 124 that includes the webtask token and the data 106, is an HTTP request. Alternatively, other protocols, or Remote Procedure Calls (RPCs) may be used, provided that only a single, generalized endpoint is exposed to the developer.

In step 414, the webtask server 107 sends the webtask request 124 to the MTIS 140. In this regard, the webtask server 107 requests a container that has all the infrastructure to be used by the computer routine from the MTIS 140. In one embodiment, the MTIS 140 may include language bindings for various supported languages. For example, the MTIS 140 may have JavaScript binding and C #bindings. Where an unsupported language arrives in a request, the MTIS 140 may provide an appropriate error message.

In step 416, the MTIS 140 extracts the computer routine to be executed and executes the computer routine in an isolated environment (i.e., webtask container) of the MTIS 140. The webtask container may be executed in a sandbox environment of the MTIS 140. The MTIS 140 also constructs a response in a format that is compatible with the protocols used by the webtask server 107. In various embodiments, the response may be in XML, JSON, and the like. Thus, the MTIS provides a generic and uniform execution environment for the received webtask request.

In one embodiment, the MTIS tracks the resources (e.g., CPU, memory, etc.) that have been consumed during execution of the computer routine in the webtask container of the MTIS 140 associated with the request identification (ID), for billing purposes (i.e., step 418). The MTIS 140 may use the webtask server 107 generated request ID and associate it with a Thread ID either from the JavaScript runtime, from the operating system, or one internally generated by the MTIS 140. In one embodiment, by associating the thread resources used with the request ID, metering on resources consumed per request basis are realized. Resource tracking need not be limited to CPU, memory (e.g., random access memory (RANI), hard-disk), but can include any meter-able resource such as network resources utilized during the execution of the computer routine.

In one embodiment, in step 420, the MTIS sends a response to the webtask server 107. The response may be a calculated result based on the computer routine executed in the MTIS 140. If the MTIS is not able to satisfy the request, or may not satisfy the request in time, the MTIS may return a response to the webtask server with an appropriate response (i.e., error message). Thus, the response from the MTIS may be a calculated result based on the executed computer routine or an appropriate error message.

In step 422, the response is forwarded from the webtask server 107 to the client 102. Alternatively or in addition, the response may be forwarded directly from the MTIS to the client 102.

Optionally, in step 424, a confirmation may be received by the MTIS 140 from the webtask server that the result has been received by the webtask server. In step 426 the MTIS 140 performs resource de-allocation, as appropriate. In one embodiment, the container that has been used is not returned to the pool; rather, it is discarded and replaced. The MTIS 140 destroys the webtask container, thereby assuring that the computer routine is not stored at rest.

Example Use Cases

With the foregoing explanation of the system and method of encapsulating computer routine in a server request, it may be helpful to provide a high-level discussion of some example use cases. The concepts and system discussed herein can be applied to various use cases. For example, they may be applied to distributed applications, where an application may be architected into separate components, each designed to operate independently of others. Those separate components can send the computer routine to be executed via the MTIS 140 to different instances.

In one example, the system described herein can be used for offloading. To that end, an application may execute a routine either locally or remotely using the MTIS 140. In situations where the local computing resources are not available or are insufficient, the application may offload computing requests to the cloud via the MTIS 140.

In one example, the concepts discussed herein can be used for scripting WEB services. An application may provide a facility for end users to make scripts that avail themselves to different functionalities embodied in the computer routine. Some of the scripts, may execute on the cloud via the MTIS 140.

In one example, the system described herein can be used in asynchronous execution applications. In such a scenario, the computer routine executed on the MTIS 140 need not be executed synchronously. In this regard, the webtask server 107 may act as a dispatcher for long-lived/long-running processes.

In one example, the concepts discussed herein may be used for vertical applications/security. A Security API may be implemented to be executed in a multi-tenant infrastructure server application that maintains a sandbox. In one embodiment, the MTIS 140 may support encryption to secure the connection between a client and the multi-tenant infrastructure server application. Because the computer routine is not resident in the MTIS 140 and because all computer routines run in a secure sandbox, the MTIS 140 provides a secure execution environment for authentication functions as exposed via a security API. As to security, in one implementation, the MTIS 140 can be used to implement authentication, authorization, auditing, and/or metering functions at a proxy level in a multi-tier application.

Example Computer Platform

Figure 5:
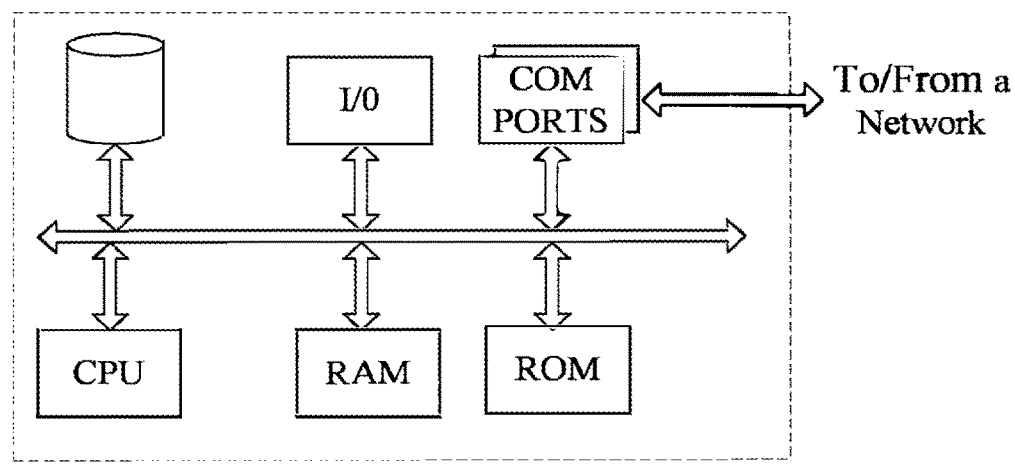
FIG. 5 illustrates a network or host computer that may be on a cloud.

As discussed above, functions for establishing a connection to a webtask server, sending a request to execute a computer routine, sending and receiving messages, sending and receiving webtask tokens, creating webtask containers, executing a computer routine in an isolated environment, and other functions, can be implemented on computers connected for data communication via network 130, operating as the client server 102, webtask server 107, and MTIS 140, as shown in FIG. 5. Although special purpose devices may be used, such devices also may be implemented using one or more hardware platforms intended to represent a general class of data processing device commonly used to run "server" programming so as to implement functions such as the functions discussed herein, albeit with an appropriate network connection for data communication.

Figure 6:
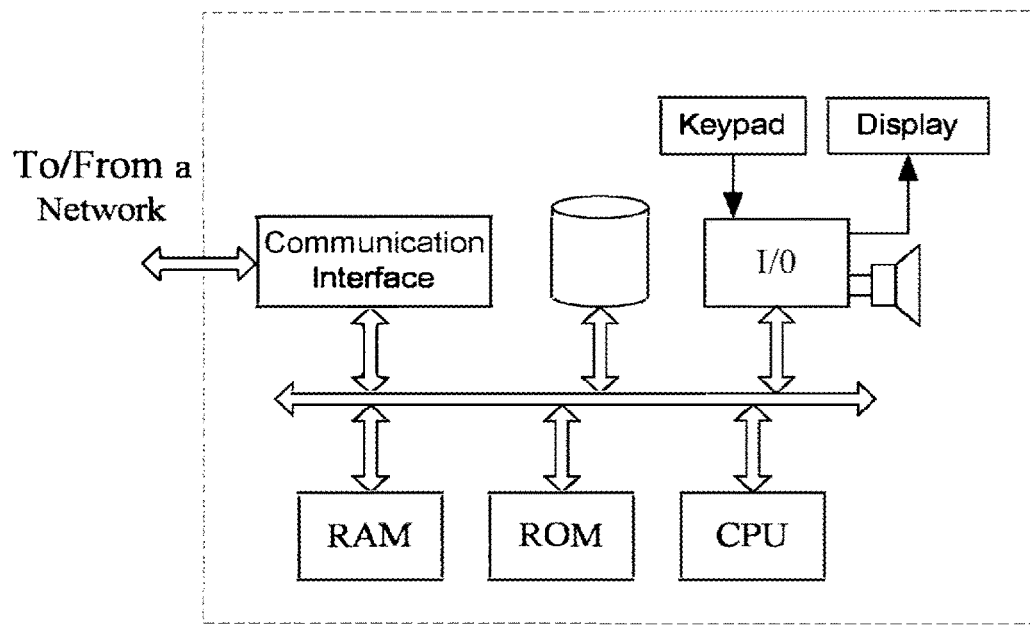
FIG. 6 illustrates a computer with user interface elements.

FIGS. 5 and 6 provide functional block diagram illustrations of general-purpose computer hardware platforms that may also be applied for cloud computing. FIG. 5 illustrates a network or host computer platform, as may typically be used to implement a server, such as a webtask server 107 or MTIS 140. FIG. 6 depicts a device with user interface elements, as may be used to implement a personal computer or a client computing device such as client 102. It is believed that the general structure and general operation of such equipment as shown in FIGS. 5 and 6 should be self-explanatory from the high-level illustrations.

A general-purpose computer configured as a server, for example, includes a data communication interface for packet data communication over the network 130. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

As discussed above, requests to the MTIS may be done from a client machine. A client machine may be any device with a processor, memory, and a network connection sufficient to connect to a cloud server, either directly or via the Internet, similar to that of FIG. 6. Typically there will be an operating system. Typical configurations are a central processing unit, RAM, and Wi-Fi or Ethernet connectivity. The memory will be computer-readable media and/or will have access to other computer-readable media, and will run a client application comprised of computer executable code resident in the memory and/or other computer-readable media.

Similarly, a cloud server, such as the one depicted in FIG. 5, may be a device with a processor, memory, and a network connection sufficient to connect to a client machine either directly or via the Internet. As with a client machine, typically there will be an operating system. Typical configurations are a central processing unit, RANI, and Wi-Fi or Ethernet connectivity. The memory will be computer-readable media and/or will have access to other computer-readable media, and will run a client application comprised of computer executable code resident in the memory and/or other computer-readable media.

The cloud server will generally run a virtualization environment that may create virtual machines. In each virtual machine, there may be an operating system, or system level environment. Each virtual machine may spawn processes, each of which may spawn threads. An execution environment such as a Java Virtual Machine, or .NET runtime may execute in a virtual machine and manage processes and threads.

Computer-readable media, such as the RANI and ROM depicted in FIGS. 5 and 6 includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The software functionalities involve programming, including executable code as well as associated stored data, e.g., files used for applications on the webtask server 107 and the MTIS 140 for sending a request to execute a computer routine, sending and receiving messages, sending and receiving webtask tokens, creating webtask containers, executing a computer routine in an isolated environment, and other functions. The software code is executable by the computing device. In operation, the code is stored within the computing device. At other times, however, the software may be stored at other locations and/or transported for loading into the appropriate computing device system. Execution of such code by a processor of the computing device enables the computing device to perform various functions, in essentially the manner performed in the implementations discussed and illustrated herein.

Hence, aspects of the methods of receiving and processing node data as outlined above may be embodied in programming. Program aspects of the technology may be thought of as "products" or "articles of manufacture" typically in the form of executable code and/or associated data that is carried on or embodied in a type of non-transitory machine-readable medium.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving a request that includes:
      a computer routine comprising one of computer code or a uniform resource locator (URL) link to the computer code, and
      a secret for accessing protected data or a protected functionality associated with the computer routine, wherein the secret comprises a database connection string, an application program interface (API) key, or a security key associated with the computer routine;
   analyzing the computer routine to determine one or more programming languages used in the computer routine;
   creating, in response to the request and using one or more language bindings corresponding to the determined one or more programming languages, a container in an isolated environment at a server, wherein the container is associated with a webtask cluster that includes one or more firewall rules that prevent an untrusted computer routine in one webtask container from communicating with other webtask containers and webtask infrastructure associated with the webtask cluster;
   assigning computing resources to the container to create an execution environment for the request;
   executing the computer routine in the container;
   determining, based at least in part on associating a request ID associated with the container with a thread ID associated with thread resources, computing resources consumed during execution of the computer routine;
   returning a calculated result based on executing the computer routine; and
   destroying the container upon completion of executing the computer routine.

2. The method of claim 1, wherein providing the container in the isolated environment at the server comprises providing a filesystem that includes components for executing the computer routine in the isolated environment, the components comprising runtime, system tools, and system libraries.

3. The method of claim 1, wherein the URL link to the computer code comprises a URL link to an online file storage server.

4. The method of claim 3, further comprising analyzing the computer code stored by the online file storage server to determine a programming language associated with the computer code.

5. The method of claim 1, wherein receiving the request comprises receiving a bundle that combines both the URL link and the secret.

6. The method of claim 1, wherein receiving the request comprises receiving the request via an HTTP endpoint.

7. The method of claim 1, wherein the request further includes client data used by the computer routine.

8. The method of claim 1, further comprising tracking resources used by the computer code during execution of the computer routine.

9. The method of claim 1, wherein executing the computer routine comprises executing one of a long-lived or long-running process.

10. The method of claim 1, wherein the computer code comprises a JavaScript function.

11. A non-transitory computer-readable storage medium for tangibly storing computer program instructions capable of being executed by at least one computer processor, the computer program instructions defining steps of:
   receiving a request that includes:
      a computer routine comprising a uniform resource locator (URL) link to an online file storage server storing computer code, and
      a secret for accessing protected data or a protected functionality associated with the computer routine, wherein the secret comprises a database connection string, an application program interface (API) key, or a security key associated with the computer routine;
   analyzing the computer code stored by the online file storage server to determine a programming language associated with the computer code;
   creating, in response to the request and using one or more language bindings corresponding to the determined programming language, a container in an isolated environment at a server, wherein the container is associated with a webtask cluster that includes one or more firewall rules that prevent an untrusted computer routine in one webtask container from communicating with other webtask containers and webtask infrastructure associated with the webtask cluster;
   assigning computing resources to the container to create an execution environment for the request, wherein the computing resources comprise one of compute or memory resources;
   executing the computer routine in the container;
   determining, based at least in part on associating a request ID associated with the container with a thread ID associated with thread resources, computing resources consumed during execution of the computer routine; and returning a calculated result based on executing the computer routine.

12. The non-transitory computer-readable storage medium of claim 11, wherein receiving the request comprises receiving a bundle that combines both the URL link and the secret.

13. The non-transitory computer-readable storage medium of claim 11, wherein receiving the request comprises receiving the request via an HTTP endpoint.

14. The non-transitory computer-readable storage medium of claim 11, wherein the request further includes client data used by the computer routine.

15. The non-transitory computer-readable storage medium of claim 11, further comprising tracking resources used by the computer code during execution of the computer routine.

16. The non-transitory computer-readable storage medium of claim 11, wherein executing the computer routine comprises executing one of a long-lived or long-running process.

17. The non-transitory computer-readable storage medium of claim 11, wherein the computer code comprises a JavaScript function.

18. A device comprising:
at least one processor; and
a storage medium for tangibly storing thereon logic for execution by the at least one processor, the logic comprising instructions for:
   receiving a request that includes:
      a computer routine comprising one of computer code or a uniform resource locator (URL) link to the computer code, and
      a secret for accessing protected data or a protected functionality associated with the computer routine, wherein the secret comprises a database connection string, an application program interface (API) key, or a security key associated with the computer routine;
   analyzing the computer routine to determine one or more programming languages used in the computer routine;
   creating, in response to the request and using one or more language bindings corresponding to the determined one or more programming languages, a container in an isolated environment at a server, wherein the container is associated with a webtask cluster that includes one or more firewall rules that prevent an untrusted computer routine in one webtask container from communicating with other webtask containers and webtask infrastructure associated with the webtask cluster;
   assigning computing resources to the container to create an execution environment for the request;
   executing the computer routine in the container;
   determining, based at least in part on associating a request ID associated with the container with a thread ID associated with thread resources, computing resources consumed during execution of the computer routine;
   returning a calculated result based on executing the computer routine; and
   destroying the container upon completion of executing the computer routine.

19. The device of claim 18, wherein the URL link to the computer code comprises a URL link to an online file storage server.

20. The device of claim 19, further comprising analyzing the computer code stored by the online file storage server to determine a programming language associated with the computer code.

* * * * *